United States Patent
Anderson

(10) Patent No.: US 10,038,858 B1
(45) Date of Patent: Jul. 31, 2018

(54) AUTOMATED STOP-MOTION ANIMATION

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,815

(22) Filed: Mar. 31, 2017

(51) Int. Cl.
| | |
|---|---|
| H04N 7/18 | (2006.01) |
| H04N 5/225 | (2006.01) |
| G03B 17/00 | (2006.01) |
| G03B 15/03 | (2006.01) |
| H04N 5/262 | (2006.01) |
| H04N 5/232 | (2006.01) |
| G01P 13/00 | (2006.01) |

(52) U.S. Cl.
CPC ........... *H04N 5/2621* (2013.01); *G01P 13/00* (2013.01); *H04N 5/232* (2013.01)

(58) Field of Classification Search
CPC .... H04N 5/2625; H04N 7/188; H04N 5/2627; G06T 13/80
See application file for complete search history.

(56) References Cited

U.S. PATENT DOCUMENTS

| | | | |
|---|---|---|---|
| 9,242,379 B1 * | 1/2016 | Mosley | B25J 9/1664 |
| 9,386,281 B2 * | 7/2016 | Trundle | G08B 13/19602 |
| 2002/0041339 A1 * | 4/2002 | Diepold | G06T 7/20 |
| | | | 348/700 |
| 2005/0244047 A1 * | 11/2005 | Kern, Jr. | G06T 7/0004 |
| | | | 382/141 |
| 2007/0285560 A1 * | 12/2007 | Perlman | G06T 1/0007 |
| | | | 348/371 |
| 2008/0122927 A1 * | 5/2008 | Konno | G08B 13/19626 |
| | | | 348/143 |
| 2009/0189981 A1 * | 7/2009 | Siann | H04N 7/183 |
| | | | 348/143 |
| 2016/0063750 A1 * | 3/2016 | Bhargava | G06T 13/20 |
| | | | 345/473 |
| 2016/0191816 A1 * | 6/2016 | Hoshika | H04N 5/2621 |
| | | | 386/280 |
| 2016/0224839 A1 * | 8/2016 | Dempsey | G08B 13/196 |
| 2017/0300777 A1 * | 10/2017 | Zhu | G06T 7/204 |
| 2018/0059515 A1 * | 3/2018 | Greenthal | G03B 17/561 |

OTHER PUBLICATIONS

Han, Xiaoguang, "A Video-based Interface for Hand-Driven Stop Motion Animation Production", IEEE Computer Graphics and ApplicationsCity University of Hong Kong, [Online]. Retrieved from the Internet: URL: http://sweb.cityu.edu.hk/hongbofu/projects/StopMotion_CGA/#.UTjSIuvWE4q, (2013), 3 pgs.

* cited by examiner

*Primary Examiner* — Chia-Wei A Chen
(74) *Attorney, Agent, or Firm* — Schwegman Lundberg & Woessner, P.A.

(57) ABSTRACT

Various systems and methods for automated stop-motion animation are described herein. An image capture system for automated stop-motion animation includes a motion sensing subsystem to: monitor motion in a camera field of view of the image capture system; and detect when there is no motion in the camera field of view for longer than a threshold period; an image capture device to capture a capture image of the camera field of view; and a video renderer to add the capture image with a set of other images to form a stop-motion animation.

22 Claims, 8 Drawing Sheets

US 10,038,858 B1

AUTOMATED STOP-MOTION ANIMATION

TECHNICAL FIELD

Embodiments described herein generally relate to media capture and in particular, to automated stop-motion animation.

BACKGROUND

Stop-motion animation is an animation technique to a make a stationary real-world object appear to move. The object may be moved in small increments between individually photographed frames. When the frames are shown in quick succession, the object appears to move.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide automated stop-action animation. Stop-motion animation created by traditional methods include the laborious task of moving one or more physical pieces in a set, taking a picture, and repeating this process to construct the animation needed in a particular scene. Automating portions of this process may increase the enjoyment of movie making, and eventually result in more people creating content. The present systems and methods improve the conventional stop-motion movie making method of arranging pieces in a field of view, then activating a camera using a shutter release, and then moving back to the scene to rearrange pieces again. Using automatic image capture, using the improved systems and methods described herein, the stop-motion movie maker is able to stay at or near the scene and have the camera actuate automatically. Various modes and mechanisms to automate stop-motion animation are described herein.

Figure 1:
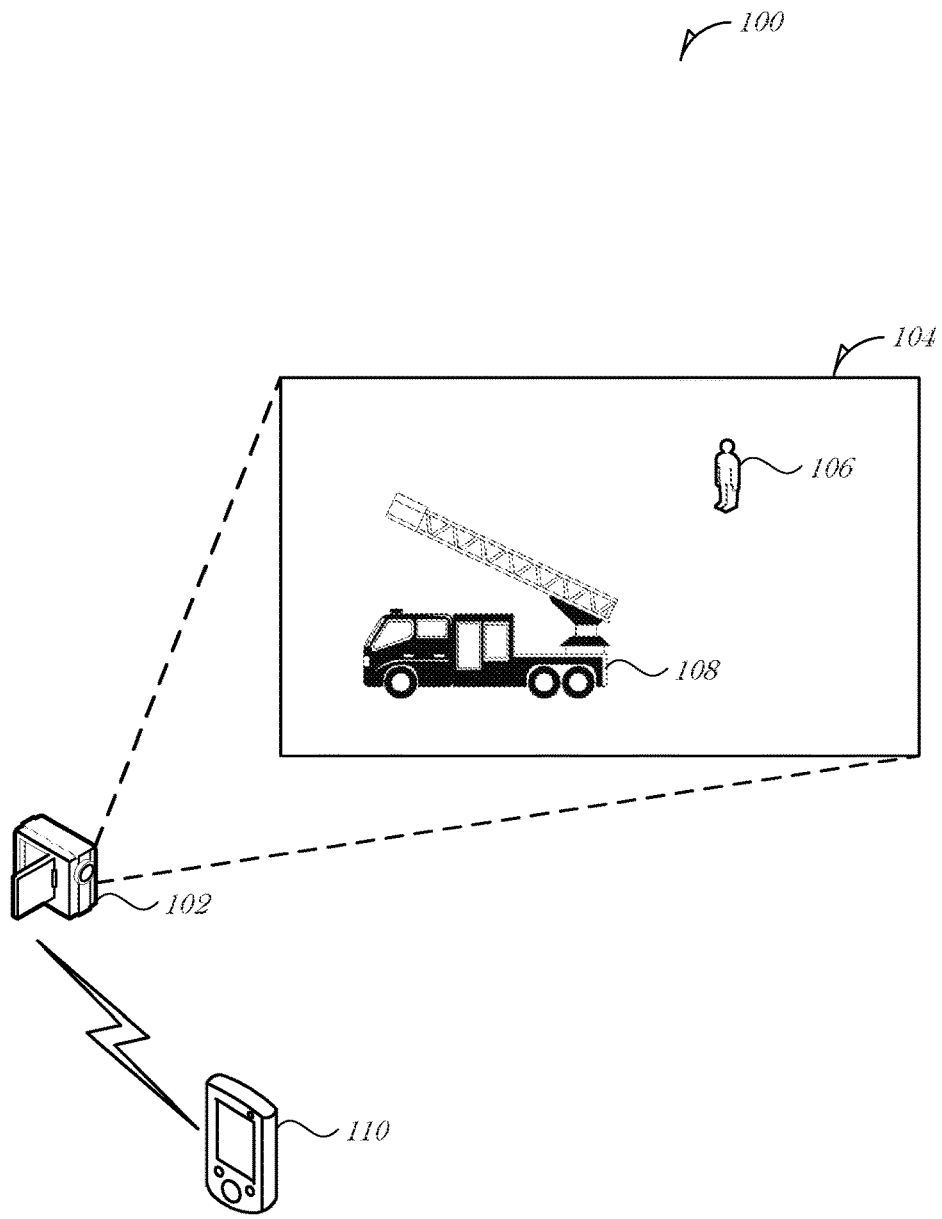
FIG. 1 is a schematic drawing illustrating an environment to create stop-motion animation, according to an embodiment.

FIG. 1 is a schematic drawing illustrating an environment 100 to create stop-motion animation, according to an embodiment. The environment 100 includes a camera 102 with a field of view 104, and several objects 106 and 108 in the field of view 104. The objects 106 and 108 may include any type of object, such as action figures, toy cars or trucks, stuffed animals, clay figures, office supplies, plants, etc. The objects 106 and 108 may be manipulated by a user (not shown) to create a video.

The camera 102 may be a standalone camera or a camera integrated into another device, such as a smartphone or a tablet computer. The camera 102 may be incorporated into a wearable device, such as a glasses-based device, or may be a standalone camera simply attached to a person's hand or head with an elastic strap. The camera 102 may operate to process the images to render an output stop-motion video. Alternatively, the camera 102 may be communicatively coupled to another device 110, which performs the image processing. The device 110 may be any type of computing device, such as a desktop, laptop, hybrid, smartphone, tablet, or the like. The camera 102 and device 110 may be coupled by wired or wireless connections, such as with a universal serial bus (USB) connection, Bluetooth, serial connection, or the like. Although only one camera 102 is shown in FIG. 1, it is understood that several cameras may be used, for example, to capture several camera angles and compose a more complex output video.

In operation, the user arranges the objects 106 and 108 within the framed scene. The camera 102 detects a lack of motion. For example, the camera 102 may monitor the field of view 104 and detect the user's hand moving an object 106. When the user's hand leaves the field of view 104, the camera 102 may capture an image. The user is free to move one or more objects 106 and 108, in small or large amounts. The camera 102 (or the device 110) may detect when the user's hand (or other mechanism used to move the objects 106 and 108) is in the field of view 104. The user may move the objects 106 and 108 with their hand or other portion of their body. The user may also move the objects 106 and 108 with various move mechanisms or apparatus, such as a pointer, a grabber tool, a prosthetic, or the like. The camera 102 or device 110, may eventually detect that motion has ceased and capture an image. Images captured in this manner may be aggregated or concatenated, resulting in a video where the inanimate objects 106 and 108 appear to move.

The camera 102 may have a timeout period before triggering an image capture. For instance, the camera 102 may wait to detect movement, then wait until movement is not detected, and then wait for another threshold period, such as three seconds, before capturing the image. The threshold period is useful to avoid false positives, such as for example, where the user may be in-frame, but substantially motionless for a second or two while adjusting the object 106 or 108. When the user removes their hand from the field of view 104 and the threshold period elapses, the image may be captured without having the user's hand in the view.

The camera 102 may use a motion sensor to detect when motion occurs in the field of view 104. An example motion sensor is a passive infrared (PIR) sensor. Other example motion sensors include, but are not limited to, active IR, radar, LIDAR, microwave, ultrasonic, etc. The motion sensor may have a field of view that is substantially coextensive with the camera's field of view 104 to ensure that no motion is accidentally captured by the camera 102.

Alternatively, the camera 102 or device 110 may process images taken over time to detect movement in the field of view 104. An image diff may be used to determine if there is any movement in the field of view 104. The images that are captured for the image diff may be a lower resolution than that captured for the stop-motion video. A timeout threshold period may be used to ensure that any movement in the field of view 104 is intentional. For instance, when moving an object 106, the user may put their hand in the field of view 104 and move the object 106 from one position to another position, or change the pose or orientation of the object 104. By doing so, the object 106 may be detected as having been moved. However, using a threshold period, if the object 106 is still for longer than the threshold period, then the object 106 is assumed to be in its next position for the stop-motion video, and an image is captured.

Other mechanisms related to motion may be used to trigger an image capture. In an example, objects 106 or 108 in the field of view 104 may be equipped with a motion sensor. When an object 106 or 108 is being moved, the motion sensor detects the movement. The motion sensor in the object 106 or 108 may be communicatively coupled to the camera 102 or device 110. When the motion sensor in the object 106 or 108 detects that the object 106 or 108 is still, a signal may be sent to the camera 102 or device 110 to initiate an image capture. A timeout threshold period may be used in this case as well to avoid capturing the user's hand or other positioning mechanism.

In another example, the user may have a wearable device and perform a triggering gesture to initiate image capture. The wearable device may be a wrist-worn device, a head-worn device, a glove, an e-textile, a shoe, or the like. The wearable device may include one or more sensors to detect motion, orientation, position, or other aspects of movement performed by the user. The wearable device may be communicatively coupled to the camera 102 or device 110 using wired or wireless communication. The triggering gesture may be configured by the user or another person. The triggering gesture may be one that is distinct to avoid false positives. Examples of triggering gestures include, but are not limited to, a sharp chopping motion with a hand, a circular motion with an arm, a double tap with a foot/toe, or a double nod motion with a head. Such gestures are less likely be performed in ordinary movements by the user, and as such are more easily distinguished as a triggering gesture. Gesture recognition may be performed by the camera 102, device 110, or another device communicatively coupled to the camera 102 (not shown).

Any of these mechanisms may be used in series or in parallel with one another. For instance, one system may use a PIR and then double-check an image diff to see if there was motion. This may be used to check for multiple kinds of motion (e.g., to detect a hand versus a tool, which may not show up with a distinctive IR signature) or just to make the system more robust. If a PIR reading was inconclusive (e.g., only produced a very brief high reading), a system may activate the camera sensor to check for image diffs.

As another example, a PIR may be used in conjunction with a gesture activation. This combination is useful to ensure that the gesture was not a false positive, where the user may have inadvertently performed the triggering gesture while adjusting an object in front of the camera. Using the PIR for a confirmation operation reduces the possibility of false positives. A similar system may be set up with a triggering gesture and an image diff, an object-based motion sensor and a triggering gesture, a PIR sensor and an image diff and a triggering sensor, or other combinations or permutations.

Figure 2:
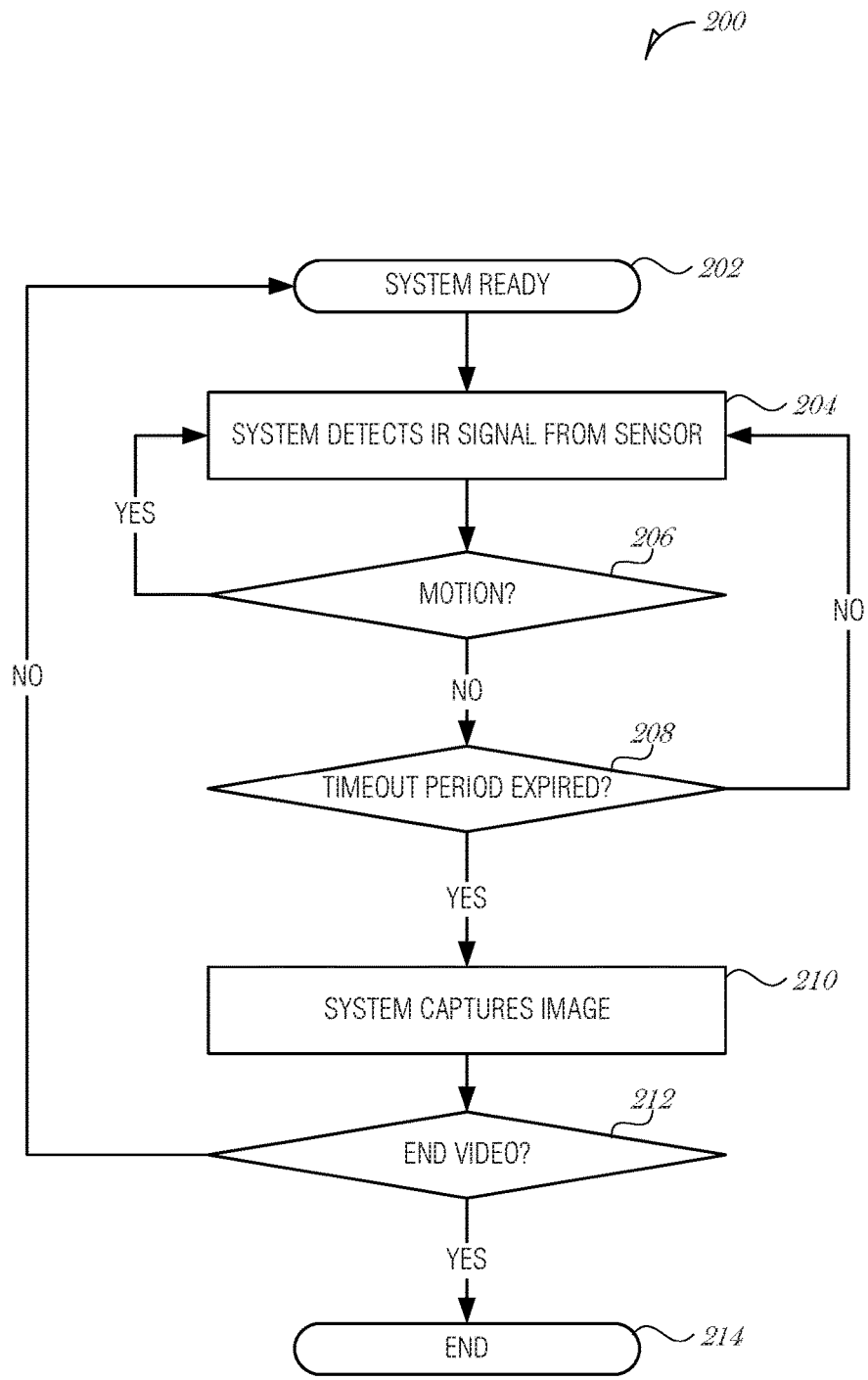
FIG. 2 is a flowchart illustrating a process for creating a stop-motion video, according to an embodiment.

FIG. 2 is a flowchart illustrating a process 200 for creating a stop-motion video, according to an embodiment. At 202, the system is ready. The system may detect an infrared (IR) signal from a sensor (operation 204). The sensor may be a PIR. A PIR works by sensing changes in IR. When an object, such as a human hand, passes in front of the PIR, the temperature differential will cause a change in the incoming IR radiation. The PIR detects this with a change in output voltage and triggers the detection (e.g., signal goes high). As long there is motion in the sensor's field of view, the signal will be high. When the motion stops (e.g., the IR radiation is non-changing), the signal will go low.

At decision block 206, it is determined whether the signal indicates a lack of motion. If the signal indicates motion (e.g., high signal in a PIR), meaning that there is motion in the sensor's field of view, the process 200 reverts to block 204 to continue detecting motion. When the signal goes low (e.g., no change in IR radiation detected), then the process 200 moves to decision block 208 and determines whether a timeout period has expired. The timeout period may be a few seconds, for example, and may be configurable by the user. If the timeout period has not expired, for example when the user moves their hand briefly out of view and then back into view again to make further adjustments, then the process 200 reverts to operation 204 to continue to detect the IR signal. If the timeout period has expired, then an image is captured (operation 210). At decision block 212, it is determined whether the user intends to end the video. For example, the user may interact with a user interface to close a recording session and save the video to memory. After the user ends the video session, the process 200 ends (operation 214).

Figure 3:
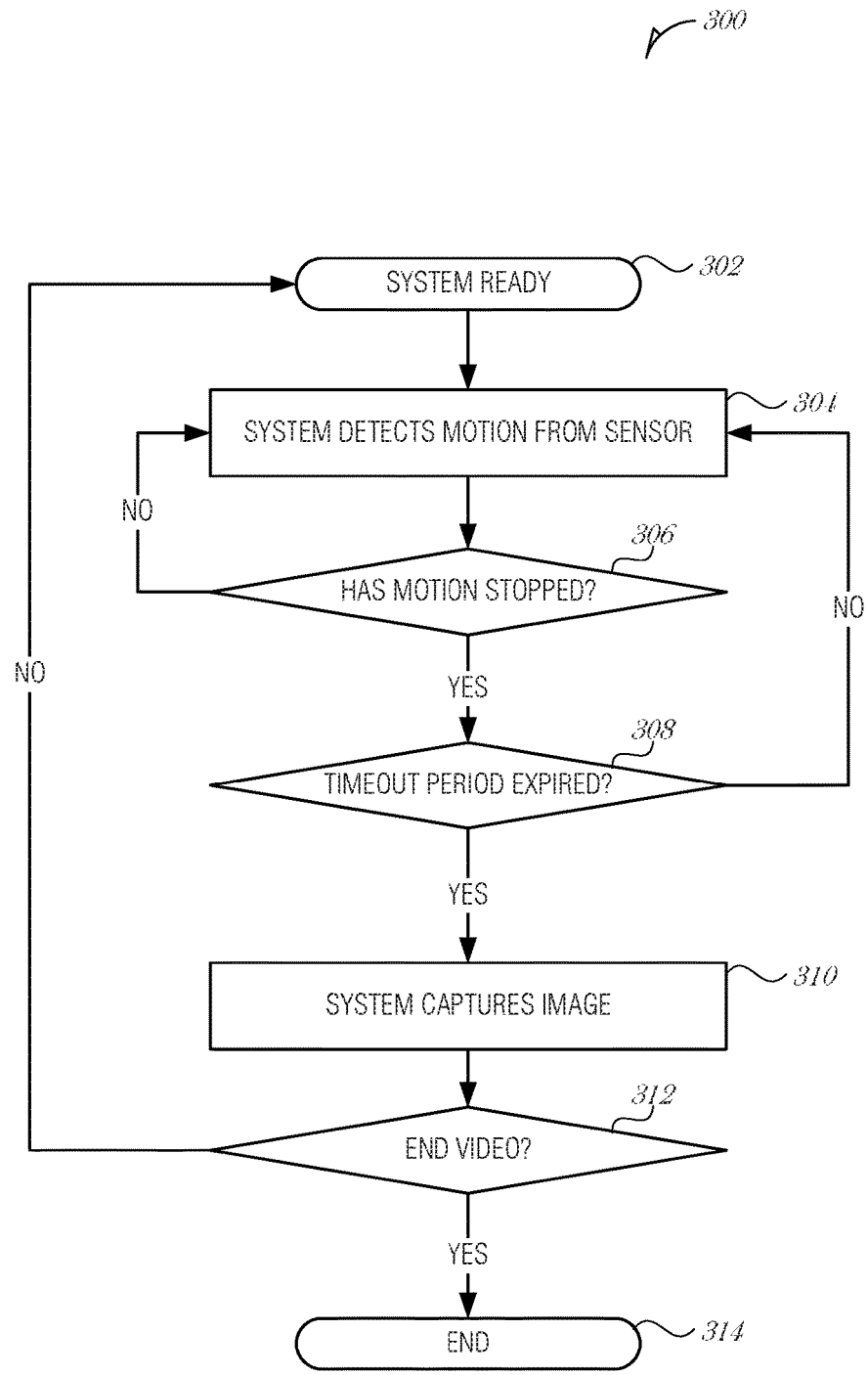
FIG. 3 is a flowchart illustrating a process for creating a stop-motion video, according to an embodiment.

FIG. 3 is a flowchart illustrating a process 300 for creating a stop-motion video, according to an embodiment. At state 302, the system is ready. The system may detect motion from a sensor (operation 304). The sensor may be a motion sensor couple to the camera (e.g., a PIR), the camera itself, or a motion sensor in an object in the field of view. At decision block 306, it is determined whether the motion has stopped. Absence of motion may be detected by a steady IR image (e.g., with a PIR), an image diff process (e.g., with images captured by the camera), or with an accelerometer or gyrometer in an object in-frame. If the motion has not stopped, then the process 300 reverts to block 304 to continue detecting the motion. When the motion stops, the process 300 moves to decision block 308 and determines whether a timeout period has expired. The timeout period may be a few seconds, for example, and may be configurable by the user. If the timeout period has not expired, for example when the user moves their hand briefly out of view and then back into view again to make further adjustments, then the process 300 reverts to operation 304 to continue to detect motion. If the timeout period has expired, then an image is captured (operation 310). At decision block 312, it is determined whether the user intends to end the video. For example, the user may interact with a user interface to close a recording session and save the video to memory. After the user ends the video session, the process 300 ends (operation 314).

Figure 4:
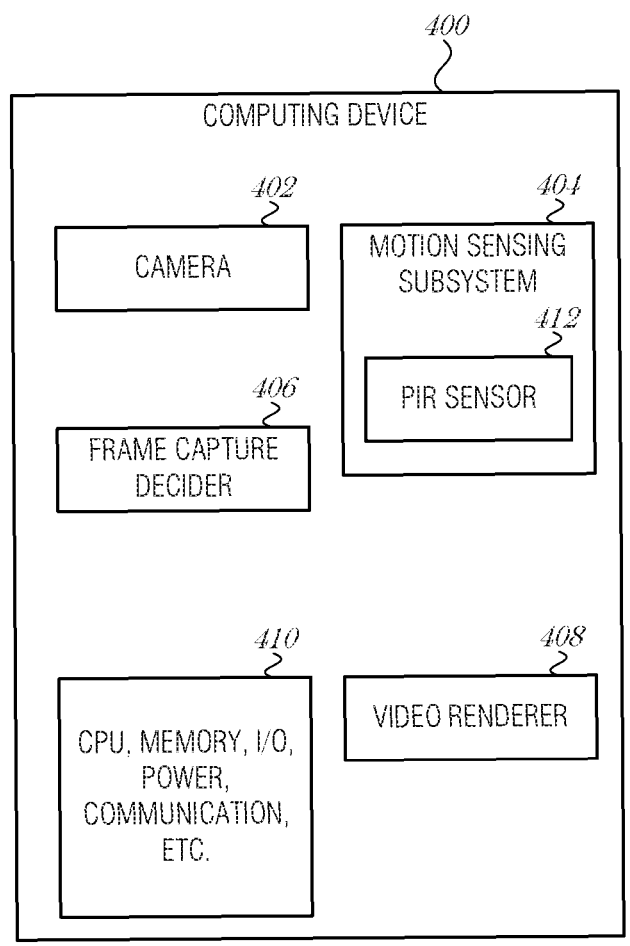
FIG. 4 is a block diagram illustrating a computing device for composing a stop-motion video, according to an embodiment.

FIG. 4 is a block diagram illustrating a computing device 400 for composing a stop-motion video, according to an embodiment. The device 400 includes a camera 402 to capture an image, a motion sensing subsystem 404 to detect motion in the camera's field of view, a frame capture decider 406 to determine when to capture the image, and a video renderer 408 to aggregate captured images into a video. The device 400 also includes other hardware 410, such as a processor, memory, input/output controllers, communication subsystems, radios, etc. The motion sensing subsystem 404 may include a PIR sensor 412. The device 400 may be configured to perform any of the operations described herein.

Figure 5:
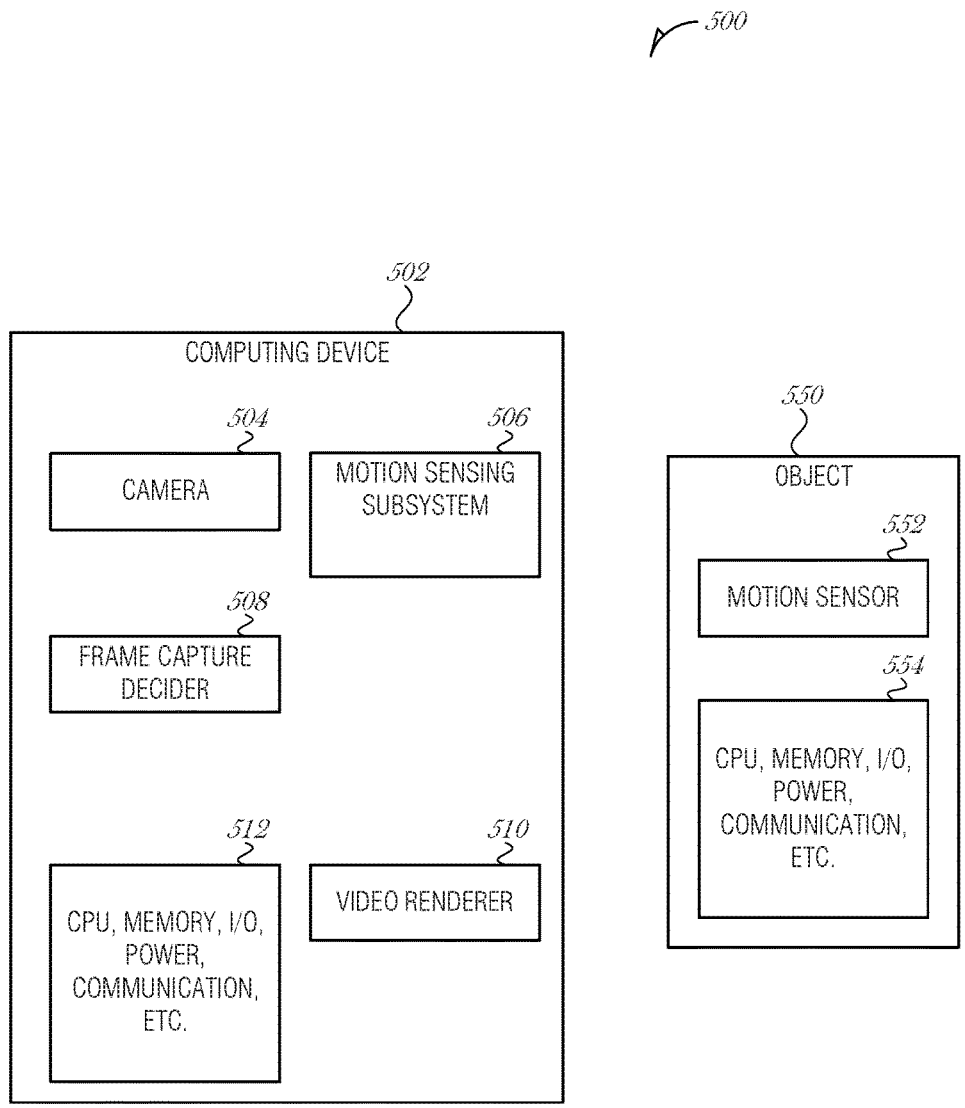
FIG. 5 is a block diagram illustrating a system for composing a stop-motion video, according to an embodiment.

FIG. 5 is a block diagram illustrating a system 500 for composing a stop-motion video, according to an embodiment. The system 500 includes a computing device 502 and an object 550. The device 502 includes a camera 504 to capture an image, a motion sensing subsystem 506 to receive signals from a motion detector 552 in the object 550, a frame capture decider 508 to determine when to capture the image, and a video renderer 510 to aggregate captured images into a video. The device 500 also includes other hardware 512, such as a processor, memory, input/output controllers, communication subsystems, radios, etc. The object 550 may include the motion sensor 552 and additional hardware 554, such as a processor, memory, input/output controllers, communication subsystems, radios, etc. The system 500 may be configured to perform any of the operations described herein.

Figure 6:
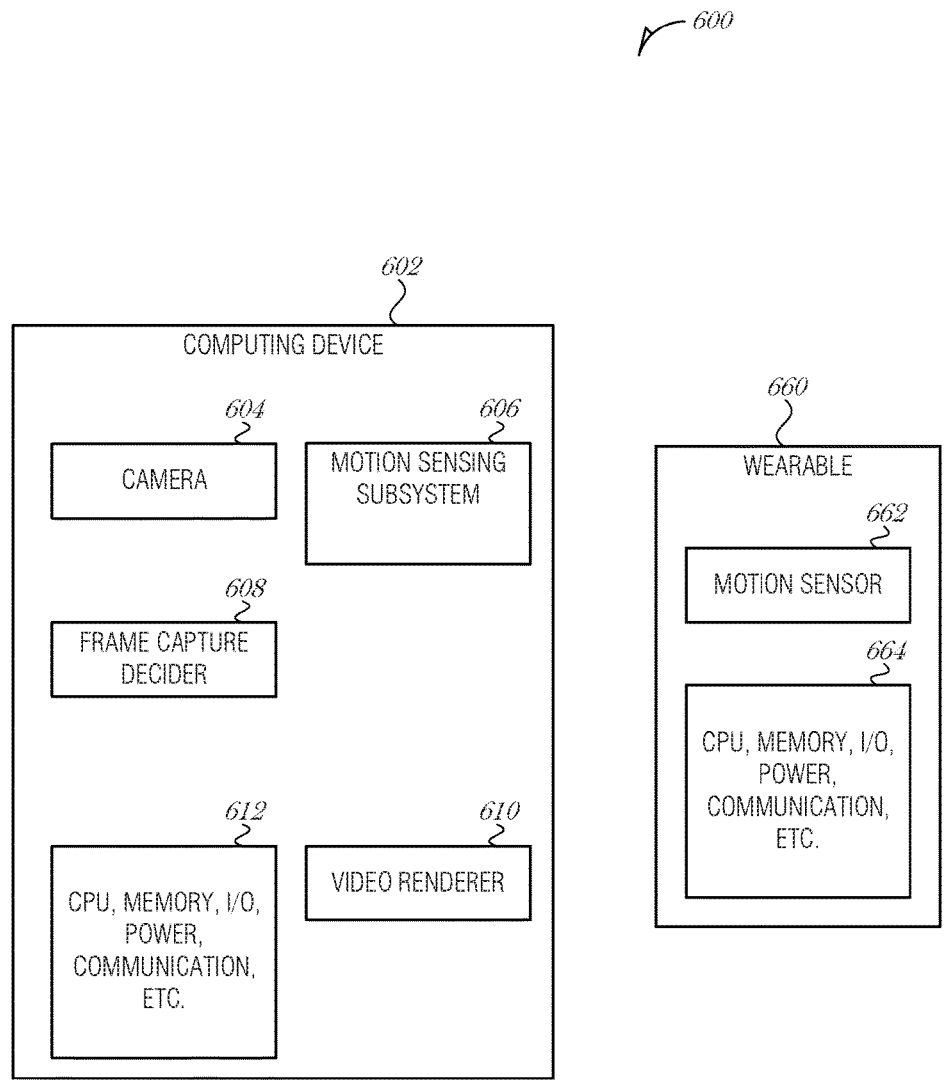
FIG. 6 is a block diagram illustrating a system for composing a stop-motion video, according to an embodiment.

FIG. 6 is a block diagram illustrating a system 600 for composing a stop-motion video, according to an embodiment. The system 600 includes a computing device 602 and a wearable device 650. The device 602 includes a camera 604 to capture an image, a motion sensing subsystem 606 to receive signals from a motion detector 652 in the wearable device 650, a frame capture decider 608 to determine when to capture the image, and a video renderer 610 to aggregate captured images into a video. The device 600 also includes other hardware 612, such as a processor, memory, input/output controllers, communication subsystems, radios, etc. The wearable device 650 may include the motion sensor 652 and additional hardware 654, such as a processor, memory, input/output controllers, communication subsystems, radios, etc. The system 600 may be configured to perform any of the operations described herein.

Figure 7:
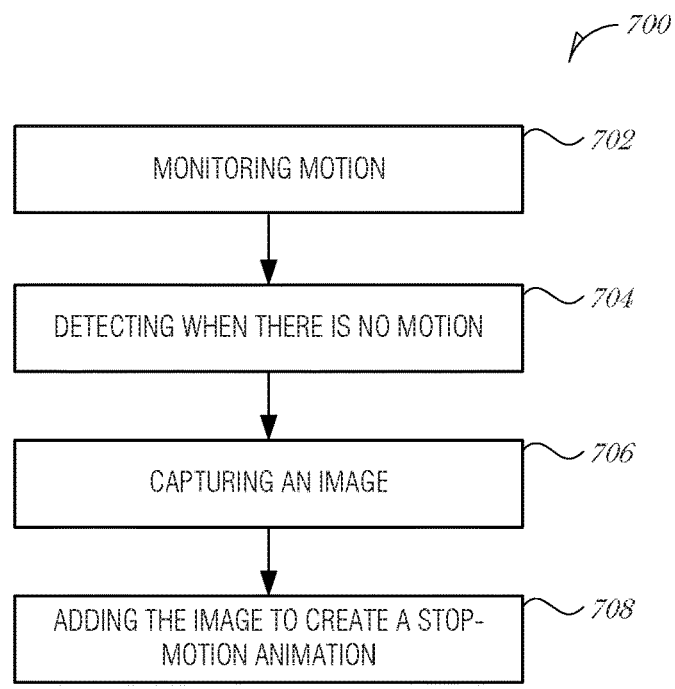
FIG. 7 is a flowchart illustrating a method of automated stop-motion animation, according to an embodiment.

FIG. 7 is a flowchart illustrating a method 700 of automated stop-motion animation, according to an embodiment. At block 702, motion in a camera field of view of an image capture system is monitored, at the image capture system.

At block 704, it is detecting when there is no motion in the camera field of view for longer than a threshold period. In an embodiment, detecting when there is no motion in the camera field of view comprises receiving sensor data from a motion sensor, the motion sensor having a field of view substantially coextensive with the camera field of view and detecting that there is no motion in the camera field of view based on the sensor data from the motion sensor. In a further embodiment, the motion sensor comprises a passive infrared sensor.

In a related embodiment, the motion sensor comprises an active sensor. In a further embodiment, the active sensor comprises an active infrared sensor. In a related embodiment, the active sensor comprises a microwave sensor.

In an embodiment, detecting when there is no motion in the camera field of view comprises receiving sensor data from a motion sensor, the motion sensor coupled to an object in the camera field of view and detecting that there is no motion in the camera field of view based on the sensor data from the motion sensor. In a further embodiment, the motion sensor comprises an accelerometer.

In an embodiment, detecting when there is no motion in the camera field of view comprises capturing, over a capture period, a series of images of objects in the camera field of view and detecting that the series of images are substantially the same, indicating that there is no movement of the objects in the series of images. In a further embodiment, the capture period is equal to the threshold period. In a related embodiment, the series of images are at a lower resolution than the capture image. By using lower resolution images, memory space may be used more efficiently and image analysis may be faster.

In an embodiment, detecting when there is no motion in the camera field of view comprises receiving a triggering gesture. In a further embodiment, receiving the triggering gesture comprises obtaining sensor data from a wearable device worn by a user of the image capture system and detecting the triggering gesture from the sensor data.

At block 706, a capture image of the camera field of view is captured.

At block 708, the capture image is added to a set of other images to form a stop-motion animation. For example, the capture image may be added to a series of captured images, which when presented in quick success make the objects in the series of captured images appear to be moving.

Figure 8:
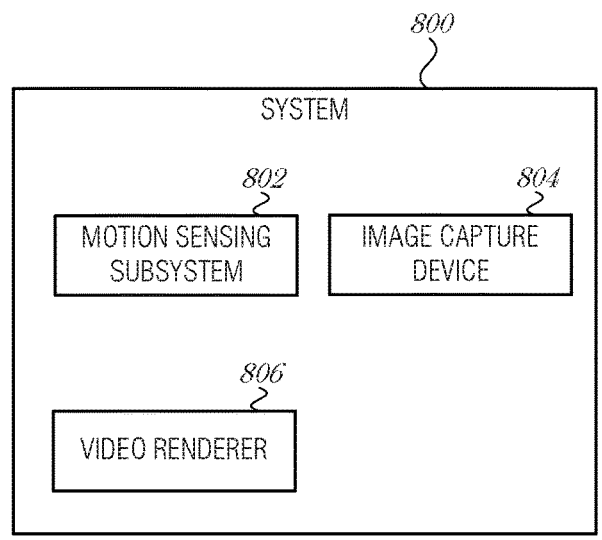
FIG. 8 is a block diagram illustrating an image capture system for automated stop-motion animation, according to an embodiment.

FIG. 8 is a block diagram illustrating an image capture system 800 for automated stop-motion animation, according to an embodiment. The system 800 includes a motion sensing subsystem 802, an image capture device 804 (camera interface circuitry), and a video renderer 806.

The motion sensing subsystem 802 may be configured to monitor motion in a camera field of view of the image capture system and detect when there is no motion in the camera field of view for longer than a threshold period.

In an embodiment, to detect when there is no motion in the camera field of view, the motion sensing subsystem 802 is to receive sensor data from a motion sensor, the motion sensor having a field of view substantially coextensive with the camera field of view and detect that there is no motion in the camera field of view based on the sensor data from the motion sensor. In a further embodiment, the motion sensor comprises a passive infrared sensor.

In an embodiment, the motion sensor comprises an active sensor. In a further embodiment, the active sensor comprises an active infrared sensor. In a related embodiment, the active sensor comprises a microwave sensor.

In an embodiment, to detect when there is no motion in the camera field of view, the motion sensing subsystem 802 is to receive sensor data from a motion sensor, the motion sensor coupled to an object in the camera field of view and detect that there is no motion in the camera field of view based on the sensor data from the motion sensor. In a further embodiment, the motion sensor comprises an accelerometer.

In an embodiment, to detect when there is no motion in the camera field of view, the motion sensing subsystem 802 is to capture, over a capture period, a series of images of objects in the camera field of view and detect that the series of images are substantially the same, indicating that there is no movement of the objects in the series of images. In a further embodiment, the capture period is equal to the threshold period. In a related embodiment, the series of images are at a lower resolution than the capture image.

In an embodiment, to detect when there is no motion in the camera field of view, the motion sensing subsystem 802 is to receive a triggering gesture. The triggering gesture may be from a wearable device, where the wearable device is configured to detect the gesture and provide an indication of the gesture performed to the system 800. Alternatively, the wearable device may pass raw (or relatively raw) sensor data to the system 800 for processing. Thus, in an embodiment, to receive the triggering gesture, the motion sensing subsystem 802 is to obtain sensor data from a wearable device worn by a user of the image capture system and detect the triggering gesture from the sensor data.

The image capture device 804 may be configured to capture a capture image of the camera field of view.

The video renderer 806 may be configured to add the capture image with a set of other images to form a stop-motion animation.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 9:
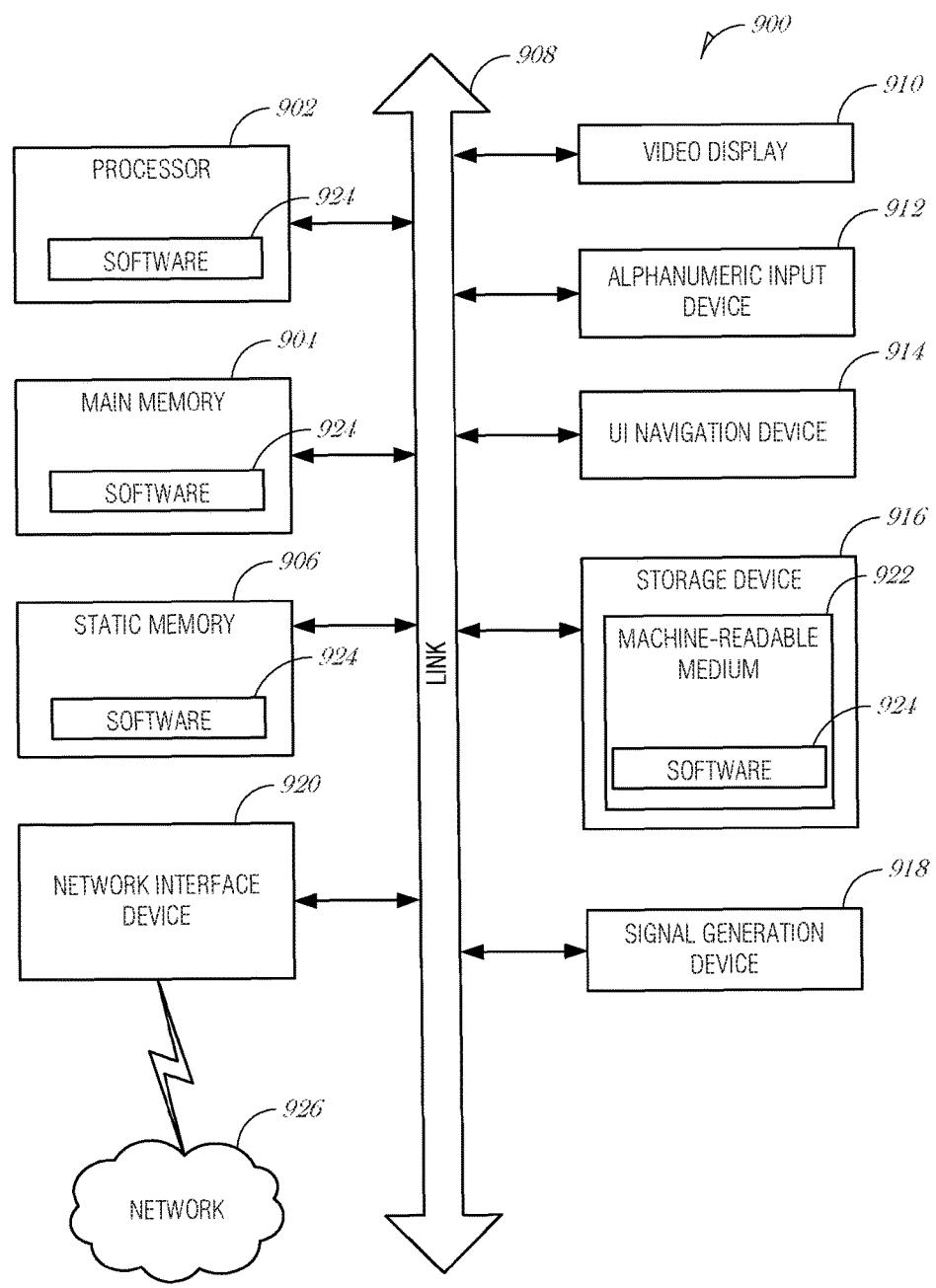
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a camera, a drone, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is an image capture system for automated stop-motion animation, comprising: a motion sensing subsystem to: monitor motion in a camera field of view of the image capture system; and detect when there is no motion in the camera field of view for longer than a threshold period; an image capture device to capture a capture image of the camera field of view; and a video renderer to add the capture image with a set of other images to form a stop-motion animation.

In Example 2, the subject matter of Example 1 optionally includes wherein to detect when there is no motion in the camera field of view, the motion sensing subsystem is to: receive sensor data from a motion sensor, the motion sensor having a field of view substantially coextensive with the camera field of view; and detect that there is no motion in the camera field of view based on the sensor data from the motion sensor.

In Example 3, the subject matter of Example 2 optionally includes wherein the motion sensor comprises a passive infrared sensor.

In Example 4, the subject matter of any one or more of Examples 2-3 optionally include wherein the motion sensor comprises an active sensor.

In Example 5, the subject matter of Example 4 optionally includes wherein the active sensor comprises an active infrared sensor.

In Example 6, the subject matter of any one or more of Examples 4-5 optionally include wherein the active sensor comprises a microwave sensor.

In Example 7, the subject matter of any one or more of Examples 1-6 optionally include wherein to detect when there is no motion in the camera field of view, the motion sensing subsystem is to: receive sensor data from a motion sensor, the motion sensor coupled to an object in the camera field of view; and detect that there is no motion in the camera field of view based on the sensor data from the motion sensor.

In Example 8, the subject matter of Example 7 optionally includes wherein the motion sensor comprises an accelerometer.

In Example 9, the subject matter of any one or more of Examples 1-8 optionally include wherein to detect when there is no motion in the camera field of view, the motion sensing subsystem is to: capture, over a capture period, a series of images of objects in the camera field of view; and detect that the series of images are substantially the same, indicating that there is no movement of the objects in the series of images.

In Example 10, the subject matter of Example 9 optionally includes wherein the capture period is equal to the threshold period.

In Example 11, the subject matter of any one or more of Examples 9-10 optionally include wherein the series of images are at a lower resolution than the capture image.

In Example 12, the subject matter of any one or more of Examples 1-11 optionally include wherein to detect when there is no motion in the camera field of view, the motion sensing subsystem is to: receive a triggering gesture.

In Example 13, the subject matter of Example 12 optionally includes wherein to receive the triggering gesture, the motion sensing subsystem is to: obtain sensor data from a wearable device worn by a user of the image capture system; and detect the triggering gesture from the sensor data.

Example 14 is a method of automated stop-motion animation, the method comprising: monitoring, at an image capture system, motion in a camera field of view of the image capture system; detecting when there is no motion in the camera field of view for longer than a threshold period; capturing a capture image of the camera field of view; and adding the capture image with a set of other images to form a stop-motion animation.

In Example 15, the subject matter of Example 14 optionally includes wherein detecting when there is no motion in the camera field of view comprises: receiving sensor data from a motion sensor, the motion sensor having a field of view substantially coextensive with the camera field of view; and detecting that there is no motion in the camera field of view based on the sensor data from the motion sensor.

In Example 16, the subject matter of Example 15 optionally includes wherein the motion sensor comprises a passive infrared sensor.

In Example 17, the subject matter of any one or more of Examples 15-16 optionally include wherein the motion sensor comprises an active sensor.

In Example 18, the subject matter of Example 17 optionally includes wherein the active sensor comprises an active infrared sensor.

In Example 19, the subject matter of any one or more of Examples 17-18 optionally include wherein the active sensor comprises a microwave sensor.

In Example 20, the subject matter of any one or more of Examples 14-19 optionally include wherein detecting when there is no motion in the camera field of view comprises: receiving sensor data from a motion sensor, the motion sensor coupled to an object in the camera field of view; and detecting that there is no motion in the camera field of view based on the sensor data from the motion sensor.

In Example 21, the subject matter of Example 20 optionally includes wherein the motion sensor comprises an accelerometer.

In Example 22, the subject matter of any one or more of Examples 14-21 optionally include wherein detecting when there is no motion in the camera field of view comprises: capturing, over a capture period, a series of images of objects in the camera field of view; and detecting that the series of images are substantially the same, indicating that there is no movement of the objects in the series of images.

In Example 23, the subject matter of Example 22 optionally includes wherein the capture period is equal to the threshold period.

In Example 24, the subject matter of any one or more of Examples 22-23 optionally include wherein the series of images are at a lower resolution than the capture image.

In Example 25, the subject matter of any one or more of Examples 14-24 optionally include wherein detecting when there is no motion in the camera field of view comprises: receiving a triggering gesture.

In Example 26, the subject matter of Example 25 optionally includes wherein receiving the triggering gesture comprises: obtaining sensor data from a wearable device worn by a user of the image capture system; and detecting the triggering gesture from the sensor data.

Example 27 is at least one machine-readable medium including instructions, which when executed by a machine, cause the machine to perform operations of any of the methods of Examples 14-26.

Example 28 is an apparatus comprising means for performing any of the methods of Examples 14-26.

Example 29 is an apparatus for automated stop-motion animation, the apparatus comprising: means for monitoring, at an image capture system, motion in a camera field of view of the image capture system; means for detecting when there is no motion in the camera field of view for longer than a threshold period; means for capturing a capture image of the camera field of view; and means for adding the capture image with a set of other images to form a stop-motion animation.

In Example 30, the subject matter of Example 29 optionally includes wherein the means for detecting when there is no motion in the camera field of view comprises: means for receiving sensor data from a motion sensor, the motion sensor having a field of view substantially coextensive with the camera field of view; and means for detecting that there is no motion in the camera field of view based on the sensor data from the motion sensor.

In Example 31, the subject matter of Example 30 optionally includes wherein the motion sensor comprises a passive infrared sensor.

In Example 32, the subject matter of any one or more of Examples 30-31 optionally include wherein the motion sensor comprises an active sensor.

In Example 33, the subject matter of Example 32 optionally includes wherein the active sensor comprises an active infrared sensor.

In Example 34, the subject matter of any one or more of Examples 32-33 optionally include wherein the active sensor comprises a microwave sensor.

In Example 35, the subject matter of any one or more of Examples 29-34 optionally include wherein the means for detecting when there is no motion in the camera field of view comprises: means for receiving sensor data from a motion sensor, the motion sensor coupled to an object in the camera field of view; and means for detecting that there is no motion in the camera field of view based on the sensor data from the motion sensor.

In Example 36, the subject matter of Example 35 optionally includes wherein the motion sensor comprises an accelerometer.

In Example 37, the subject matter of any one or more of Examples 29-36 optionally include wherein the means for detecting when there is no motion in the camera field of view comprises: means for capturing, over a capture period, a series of images of objects in the camera field of view; and means for detecting that the series of images are substantially the same, indicating that there is no movement of the objects in the series of images.

In Example 38, the subject matter of Example 37 optionally includes wherein the capture period is equal to the threshold period.

In Example 39, the subject matter of any one or more of Examples 37-38 optionally include wherein the series of images are at a lower resolution than the capture image.

In Example 40, the subject matter of any one or more of Examples 29-39 optionally include wherein the means for detecting when there is no motion in the camera field of view comprises: means for receiving a triggering gesture.

In Example 41, the subject matter of Example 40 optionally includes wherein the means for receiving the triggering gesture comprises: means for obtaining sensor data from a wearable device worn by a user of the image capture system; and means for detecting the triggering gesture from the sensor data.

Example 42 is at least one machine-readable medium including instructions for automated stop-motion animation, which when executed by a monitoring system, cause the monitoring system to: monitor, at an image capture system, motion in a camera field of view of the image capture system; detect when there is no motion in the camera field of view for longer than a threshold period; capture a capture image of the camera field of view; and add the capture image with a set of other images to form a stop-motion animation.

In Example 43, the subject matter of Example 42 optionally includes wherein the instructions to detect when there is no motion in the camera field of view comprise instructions to: receive sensor data from a motion sensor, the motion sensor having a field of view substantially coextensive with the camera field of view; and detect that there is no motion in the camera field of view based on the sensor data from the motion sensor.

In Example 44, the subject matter of Example 43 optionally includes wherein the motion sensor comprises a passive infrared sensor.

In Example 45, the subject matter of any one or more of Examples 43-44 optionally include wherein the motion sensor comprises an active sensor.

In Example 46, the subject matter of Example 45 optionally includes wherein the active sensor comprises an active infrared sensor.

In Example 47, the subject matter of any one or more of Examples 45-46 optionally include wherein the active sensor comprises a microwave sensor.

In Example 48, the subject matter of any one or more of Examples 42-47 optionally include wherein the instructions to detect when there is no motion in the camera field of view comprise instructions to: receive sensor data from a motion sensor, the motion sensor coupled to an object in the camera field of view; and detect that there is no motion in the camera field of view based on the sensor data from the motion sensor.

In Example 49, the subject matter of Example 48 optionally includes wherein the motion sensor comprises an accelerometer.

In Example 50, the subject matter of any one or more of Examples 42-49 optionally include wherein the instructions to detect when there is no motion in the camera field of view comprise instructions to: capture, over a capture period, a series of images of objects in the camera field of view; and detect that the series of images are substantially the same, indicating that there is no movement of the objects in the series of images.

In Example 51, the subject matter of Example 50 optionally includes wherein the capture period is equal to the threshold period.

In Example 52, the subject matter of any one or more of Examples 50-51 optionally include wherein the series of images are at a lower resolution than the capture image.

In Example 53, the subject matter of any one or more of Examples 42-52 optionally include wherein the instructions to detect when there is no motion in the camera field of view comprise instructions to: receive a triggering gesture.

In Example 54, the subject matter of Example 53 optionally includes wherein the instructions to receive the triggering gesture comprise instructions to: obtain sensor data from a wearable device worn by a user of the image capture system; and detect the triggering gesture from the sensor data.

Example 55 is at least one machine-readable medium including instructions, which when executed by a machine, cause the machine to perform operations of any of the operations of Examples 1-54.

Example 56 is an apparatus comprising means for performing any of the operations of Examples 1-54.

Example 57 is a system to perform the operations of any of the Examples 1-54.

Example 58 is a method to perform the operations of any of the Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An image capture system for automated stop-motion animation, comprising:
    processing circuitry to implement a motion sensing subsystem, the motion sensing subsystem to:
        monitor motion in a camera field of view of the image capture system; and
        detect when there is no motion in the camera field of view for longer than a threshold period, wherein to detect when there is no motion in the camera field of view, the motion sensing subsystem is to:
            receive sensor data from a motion sensor, the motion sensor having a field of view substantially coextensive with the camera field of view; and
            detect that there is no motion in the camera field of view based on the sensor data from the motion sensor;
    camera interface circuitry to capture a capture image of the camera field of view when there is no motion in the camera field of view; and
    a video renderer to add the capture image with a set of other images to form a stop-motion animation.

2. The system of claim 1, wherein the motion sensor comprises a passive infrared sensor.

3. The system of claim 1, wherein the motion sensor comprises an active sensor.

4. The system of claim 3, wherein the active sensor comprises an active infrared sensor.

5. The system of claim 3, wherein the active sensor comprises a microwave sensor.

6. The system of claim 1, wherein to detect when there is no motion in the camera field of view, the motion sensing subsystem is to:
receive sensor data from the motion sensor, the motion sensor coupled to an object in the camera field of view; and
detect that there is no motion in the camera field of view based on the sensor data from the motion sensor.

7. The system of claim 6, wherein the motion sensor comprises an accelerometer.

8. The system of claim 1, wherein to detect when there is no motion in the camera field of view, the motion sensing subsystem is to:
capture, over a capture period, a series of images of objects in the camera field of view; and
detect that the series of images are substantially the same, indicating that there is no movement of the objects in the series of images.

9. The system of claim 8, wherein the capture period is equal to the threshold period.

10. The system of claim 8, wherein the series of images are at a lower resolution than the capture image.

11. The system of claim 1, wherein to detect when there is no motion in the camera field of view, the motion sensing subsystem is to:
receive a triggering gesture.

12. The system of claim 11, wherein to receive the triggering gesture, the motion sensing subsystem is to:
obtain sensor data from a wearable device worn by a user of the image capture system; and
detect the triggering gesture from the sensor data.

13. A method of automated stop-motion animation, the method comprising:
monitoring, at an image capture system, motion in a camera field of view of the image capture system;
detecting when there is no motion in the camera field of view for longer than a threshold period by:
receiving sensor data from a motion sensor, the motion sensor having a field of view substantially coextensive with the camera field of view; and
detecting that there is no motion in the camera field of view based on the sensor data from the motion sensor;
capturing a capture image of the camera field of view when there is no motion in the camera field of view; and
adding the capture image with a set of other images to form a stop-motion animation.

14. The method of claim 13, wherein the motion sensor comprises a passive infrared sensor.

15. The method of claim 13, wherein the motion sensor comprises an active sensor.

16. The method of claim 15, wherein the active sensor comprises an active infrared sensor.

17. The method of claim 15, wherein the active sensor comprises a microwave sensor.

18. The method of claim 13, wherein detecting when there is no motion in the camera field of view comprises:
receiving sensor data from the motion sensor, the motion sensor coupled to an object in the camera field of view; and
detecting that there is no motion in the camera field of view based on the sensor data from the motion sensor.

19. At least one non-transitory machine-readable medium including instructions for automated stop-motion animation, which when executed by a monitoring system, cause the monitoring system to:
monitor, at an image capture system, motion in a camera field of view of the image capture system;
detect when there is no motion in the camera field of view for longer than a threshold period by:
receiving sensor data from a motion sensor, the motion sensor having a field of view substantially coextensive with the camera field of view; and
detecting that there is no motion in the camera field of view based on the sensor data from the motion sensor;
capture a capture image of the camera field of view when there is no motion in the camera field of view; and
add the capture image with a set of other images to form a stop-motion animation.

20. The at least one non-transitory machine-readable medium of claim 19, wherein the instructions to detect when there is no motion in the camera field of view comprise instructions to:
capture, over a capture period, a series of images of objects in the camera field of view; and
detect that the series of images are substantially the same, indicating that there is no movement of the objects in the series of images.

21. The at least one non-transitory machine-readable medium of claim 20, wherein the series of images are at a lower resolution than the capture image.

22. The at least one non-transitory machine-readable medium of claim 19, wherein the instructions to detect when there is no motion in the camera field of view comprise instructions to:
receive a triggering gesture.

* * * * *